(12) United States Patent
Mitani et al.

(10) Patent No.: US 12,712,375 B2
(45) Date of Patent: Aug. 18, 2026

(54) POWER SUPPLY SYSTEM

(71) Applicant: HONDA MOTOR CO., LTD., Tokyo (JP)

(72) Inventors: Manabu Mitani, Wako (JP); Masataka Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 776 days.

(21) Appl. No.: 18/189,452

(22) Filed: Mar. 24, 2023

(65) Prior Publication Data

US 2023/0318337 A1 Oct. 5, 2023

(30) Foreign Application Priority Data

Mar. 30, 2022 (JP) ................................ 2022-056775

(51) Int. Cl.
*H02J 105/30* (2026.01)
*H02J 7/00* (2026.01)

(52) U.S. Cl.
CPC ........... *H02J 7/855* (2026.01); *H02J 2105/32* (2026.01); *H02J 2207/10* (2020.01)

(58) Field of Classification Search
CPC ..................................................... H02J 7/0063
USPC ..................................... 320/127; 307/44, 45
See application file for complete search history.

(56) References Cited

U.S. PATENT DOCUMENTS

2013/0249283 A1 9/2013 Yokoyama
2017/0197565 A1 7/2017 Yoneyama et al.
2019/0131804 A1 5/2019 Taniguchi et al.
2019/0157901 A1 5/2019 Tamai
2022/0094178 A1* 3/2022 Yamaguchi ........... H02J 7/0024

FOREIGN PATENT DOCUMENTS

JP H7-36575 A 2/1995
JP 2013-235689 A 11/2013
JP 2013235689 * 11/2013 ................ B60L 3/00
JP 2017-27112 A 7/2017
JP 2017-127112 A 7/2017
JP 2017-195651 A 10/2017
WO 2012/081330 A1 6/2012
WO 2019/039082 A1 2/2019
WO WO2019039082 * 2/2019 ................ H02J 7/34

OTHER PUBLICATIONS

Japanese Office Action dated Sep. 2, 2025 issued in corresponds to Japanese application No. 2022-056775; English machine translation included (6 pages).

* cited by examiner

*Primary Examiner* — Ahmed H Omar

(74) *Attorney, Agent, or Firm* — Rankin, Hill & Clark LLP

(57) ABSTRACT

A power supply system includes: a main power source device for supplying electric power to a load device; an auxiliary power source device for supplying electric power to the load device; current sensors for detecting current flowing through a main power source circuit; a current sensor for detecting current flowing through an auxiliary power source circuit; and a load current sensor for detecting current flowing through a load circuit.

6 Claims, 8 Drawing Sheets

10
REAR
RIGHT
LEFT
FRONT
18Rd (18)
18Ld (18)
20R (20)
20L (20)
16
18Rc (18)
18Lc (18)
18Rb (18)
18Lb (18)
14
18Ra (18)
18La (18)
12

50
INV
82
84
72
FLIGHT CONTROLLER
COMPUTATION SECTION
LOAD CONTROL SECTION
86
STORAGE SECTION
74
76
70
POWER SUPPLY CONTROLLER
COMPUTATION SECTION
BATTERY MONITORING SECTION
80
FAILURE DETERMINATION SECTION
78
STORAGE SECTION
BATT
CURRENT SENSOR
52
62, 63, 64, 65

22
24
26a (26)
26b (26)
38
GT
40
GEN
42
PCU
68
I1
CONTACTOR UNIT (CONDUCTION)
CONTACTOR UNIT (INTERRUPTION)
28a (28)
28b (28)
52
BATT
32a (32)
32b (32)
56a (56)
56b (56)
56c (56)
56d (56)
I2a
I2b
I2c
I2d
62a (62)
62b (62)
62c (62)
62d (62)
54
63a (63)
63b (63)
63c (63)
63d (63)
I3a
I3b
I3c
I3d
58a (58)
58b (58)
58c (58)
58d (58)
34a (34)
34b (34)
CONTACTOR UNIT (CONDUCTION)
60
65a (65)
65b (65)
I4a
I4b
66
67
36
I5a
I5b
64a (64)
64b (64)
INV
50
MOT
48
44
18
30a (30)
30b (30)

22
24
GT
GEN
PCU
CONTACTOR UNIT
BATT
INV
MOT
A
26
28
30
32
34
36
38
40
42
44
48
50
52
54
56
58
60
62
63
65
66
67
18

22
24
26
38
GT
40
GEN
42
PCU
32
56
CONTACTOR UNIT
62
68
54
63
58
28
52
BATT
34
60
65
66
67
36
64
30
50
INV
48
MOT
44
18

22
26
38
GT
40
GEN
42
PCU
24
32
56
CONTACTOR UNIT
62
63
58
CONTACTOR UNIT
28
BATT
52
34
CONTACTOR UNIT
60
65
66
67
36
64
30
50
INV
48
MOT
44
18

22
24
26
38
GT
40
GEN
42
PCU
56
CONTACTOR UNIT
62
68
54
32
63
58
66
67
36
64
30
50
INV
48
MOT
44
18
34
60
65
28
52
BATT

POWER SUPPLY SYSTEM

CROSS-REFERENCE TO RELATED APPLICATIONS

This application is based upon and claims the benefit of priority from Japanese Patent Application No. 2022-056775 filed on Mar. 30, 2022, the contents of which are incorporated herein by reference.

BACKGROUND OF THE INVENTION

Field of the Invention

The present invention relates to a power supply system.

Description of the Related Art

JP 2013-235689 A discloses a current sensor abnormality detection device for determining whether or not each of a plurality of stack current sensors is abnormal. Each stack current sensor detects current flowing through each stack in a battery system including a plurality of stacks connected in parallel. The abnormality determination is performed based on the current flowing through the entire battery system as detected by an upstream current sensor, the current flowing through each stack as detected by each stack current sensor, and a shunt ratio which is a ratio between the current flowing through the entire battery system and the current flowing through each stack.

SUMMARY OF THE INVENTION

In the technique disclosed in JP 2013-235689 A, the shunt ratio of the current flowing through each stack is determined, and there is a problem in that it is not possible to determine whether or not each current sensor has failed in a circuit in which the shunt ratio is not determined.

An object of the present invention is to solve the above-mentioned problem.

According to an aspect of the present invention, provided is a power supply system comprising: one or more main power source devices configured to supply electric power to one or more load devices; one or more auxiliary power source devices provided for the one or more load devices, respectively, each of the auxiliary power source devices being configured to supply electric power to corresponding one of the load devices; a main power source circuit connected to the one or more main power source devices; an auxiliary power source circuit provided for each of the auxiliary power source devices and connected to corresponding one of the auxiliary power source devices; a load circuit provided for each of the load devices, connected to corresponding one of the load devices, and connected to the main power source circuit and the auxiliary power source circuit at a merging point where a current flowing through the main power source circuit and a current flowing through the auxiliary power source circuit merge together; a main power source current sensor configured to detect the current flowing through the main power source circuit; an auxiliary power source current sensor configured to detect the current flowing through the auxiliary power source circuit; and a load current sensor configured to detect a current flowing through the load circuit.

According to the present invention, it is possible to determine whether or not each current sensor has failed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Aircraft]

Figure 1:
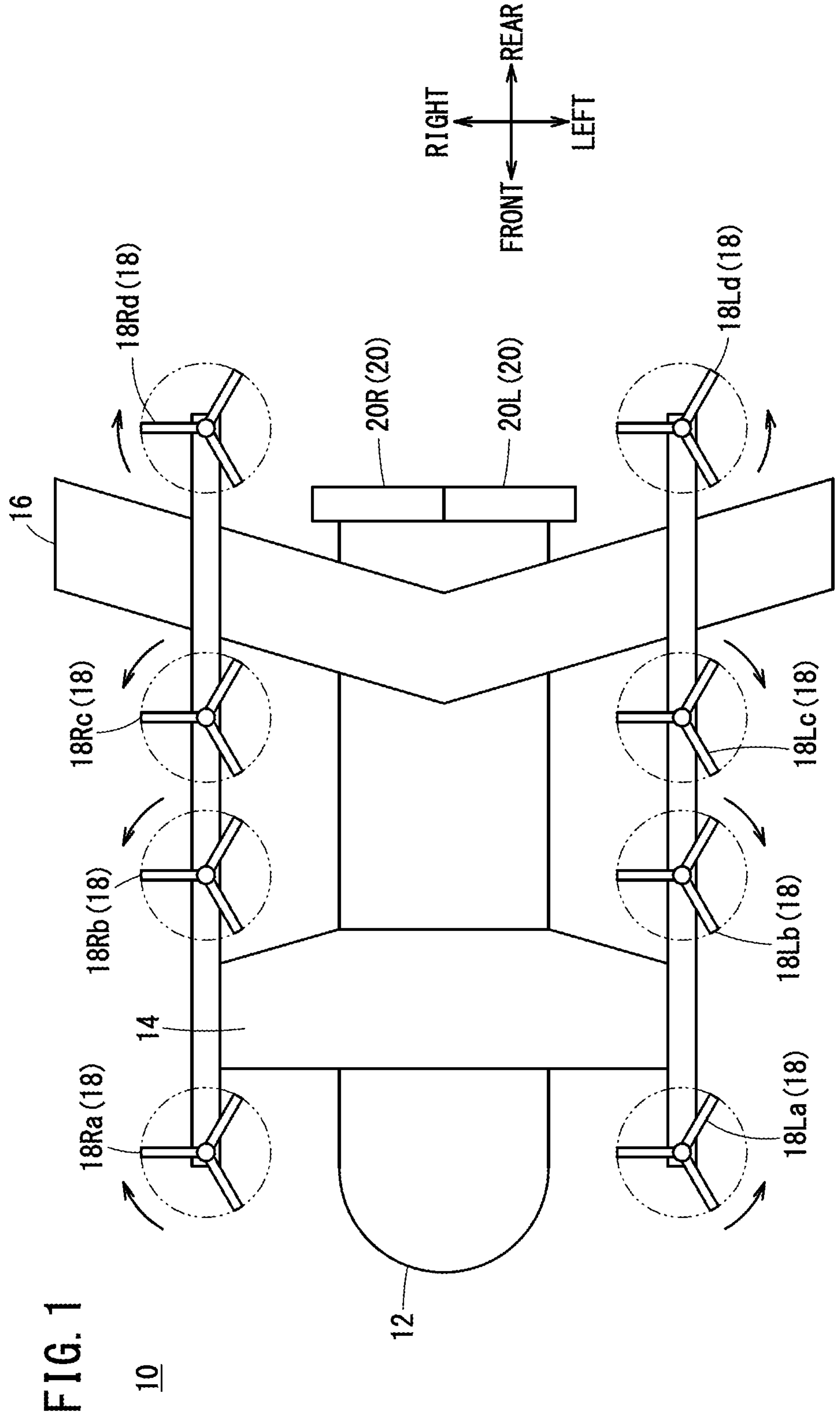
FIG. 1 is a schematic diagram of an aircraft.

FIG. 1 is a schematic diagram of an aircraft 10. The aircraft 10 of the present embodiment is an electric vertical take-off and landing aircraft (eVTOL aircraft). In the aircraft 10, rotors are driven by electric motors. The aircraft 10 generates vertical thrust and horizontal thrust by the rotors. Further, the aircraft 10 is a hybrid aircraft. The aircraft 10 includes a generator and a battery as power sources of the electric motor. In the aircraft 10, electric power generated by the generator is supplied to the electric motor. When the electric power generated by the generator is insufficient with respect to the required electric power, the electric power stored in the battery is supplied to the electric motor.

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled.

The aircraft 10 includes a front wing 14 and a rear wing 16. When the aircraft 10 moves forward, lift is generated in each of the front wing 14 and the rear wing 16.

The aircraft 10 includes eight VTOL rotors 18. The eight VTOL rotors 18 are a rotor 18La, a rotor 18Lb, a rotor 18Lc, a rotor 18Ld, a rotor 18Ra, a rotor 18Rb, a rotor 18Rc, and a rotor 18Rd.

The rotation shaft of each VTOL rotor 18 extends in the up-down direction of the fuselage 12. The thrust of each VTOL rotor 18 is controlled by adjusting the rotational speed of the rotor and the pitch angle of the blades. Each VTOL rotor 18 is used during vertical take-off, during transition from vertical take-off to cruising, during transition from cruising to vertical landing, during vertical landing, during hovering, and the like. Further, each VTOL rotor 18 is used during attitude control.

Lift thrust is generated by controlling the thrust of each VTOL rotor 18. The lift thrust indicates vertical thrust. The thrust of each VTOL rotor 18 is controlled to cause a roll moment, a pitch moment, and a yaw moment to act on the fuselage 12.

The aircraft 10 includes two cruise rotors 20. The two cruise rotors 20 are a rotor 20L and a rotor 20R. The rotor 20L and the rotor 20R are attached to the rear portion of the fuselage 12.

The rotation shaft of each cruise rotor 20 extends in the front-rear direction of the fuselage 12. The thrust of each cruise rotor 20 is controlled by adjusting the rotational speed of the rotor and the pitch angle of the blades. Each cruise rotor 20 is used during transition from vertical take-off to cruising, during cruising, during transition from cruising to vertical landing, and the like.

Cruise thrust is generated by controlling the thrust of each cruise rotor 20. The cruise thrust indicates horizontal thrust.

[Configuration of Power Supply System]

Figure 2:
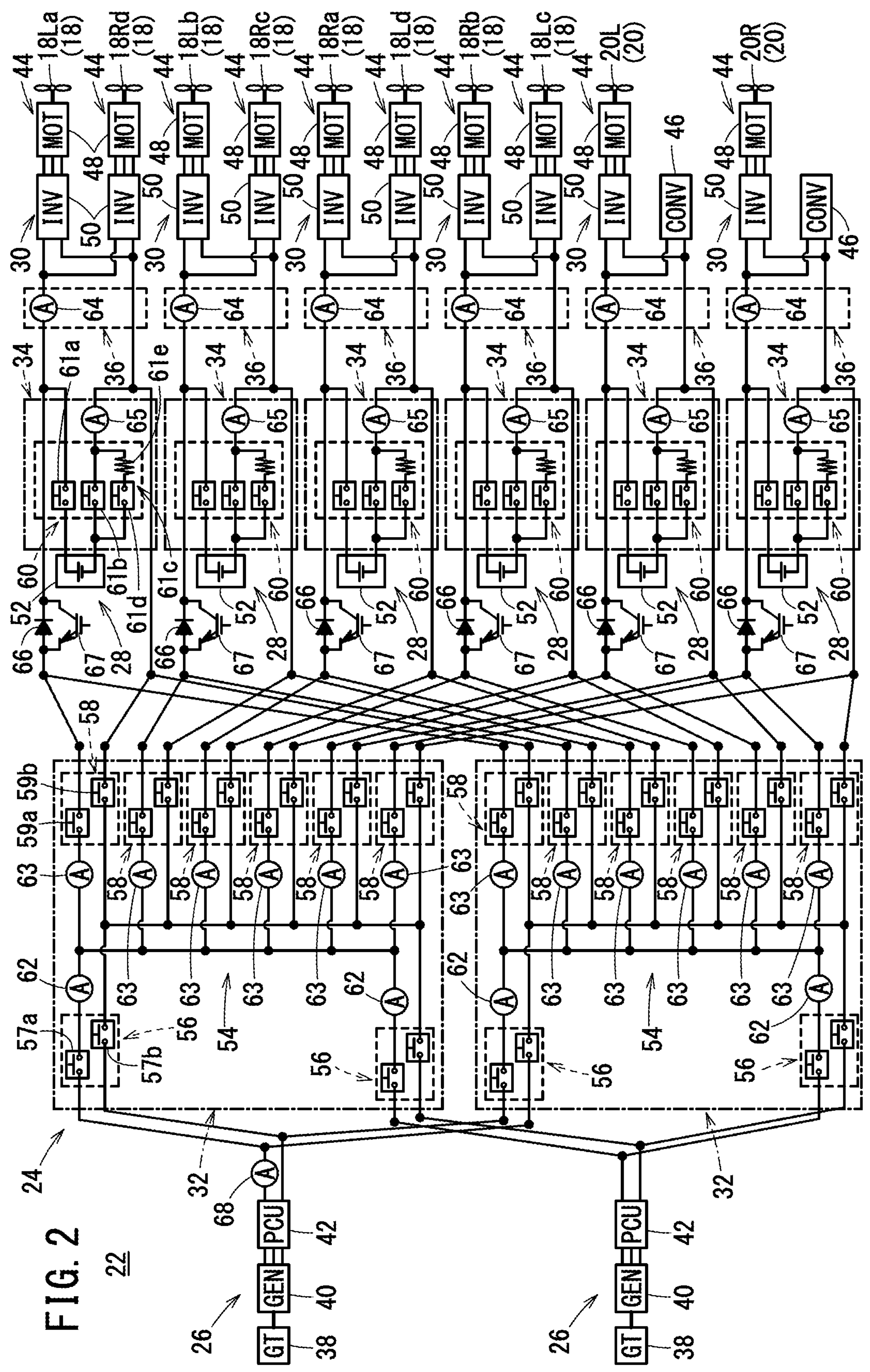
FIG. 2 is a schematic diagram showing a configuration of a power supply system.

FIG. 2 is a schematic diagram showing a configuration of a power supply system 22. The power supply system 22 includes a power supply circuit 24, two main power source devices 26, and six auxiliary power source devices 28.

The power supply circuit 24 supplies electric power from both of the two main power source devices 26 to each of six load modules 30. The auxiliary power source device 28 is provided for each load module 30. When electric power supplied from the main power source devices 26 to the load modules 30 is insufficient, electric power is supplied from the auxiliary power source devices 28 to the load modules 30. The load module 30 corresponds to a load device of the present invention.

The power supply circuit 24 includes two main power source circuits 32, six auxiliary power source circuits 34, and six load circuits 36. Each main power source circuit 32 is connected to both of the two main power source devices 26. The auxiliary power source circuit 34 is provided for each auxiliary power source device 28, and each auxiliary power source circuit 34 is connected to each auxiliary power source device 28. Each auxiliary power source circuit 34 is connected to both of the two main power source circuits 32. The load circuit 36 is provided for each load module 30, and the load circuit 36 is connected to the load module 30. Each load circuit 36 is connected to the main power source circuit 32 and the auxiliary power source circuit 34 at a merging point where current flowing through the two main power source circuits 32 and current flowing through the auxiliary power source circuit 34 merge together.

Each main power source device 26 includes a gas turbine 38, a generator 40, and a power control unit (hereinafter referred to as PCU) 42. The gas turbine 38 drives the generator 40. As a result, the generator 40 generates electric power. The PCU 42 converts the AC power generated by the generator 40 into DC power, and outputs the DC power to the power supply circuit 24.

When the gas turbine 38 is started, the PCU 42 converts the DC power supplied from the power supply circuit 24 into AC power, and outputs the AC power to the generator 40. The generator 40 is operated by the electric power input from the PCU 42, and the generator 40 drives the gas turbine 38.

Among the six load modules 30, four load modules 30 each include two drive units 44. The other two load modules 30 each include one drive unit 44 and one converter 46. The drive unit 44 drives each VTOL rotor 18 or each cruise rotor 20.

Each drive unit 44 includes an electric motor 48 and an inverter 50. The electric motor 48 is a three phase motor. Each VTOL rotor 18 is coupled to the output shaft of each electric motor 48. Each cruise rotor 20 is coupled to the output shaft of each electric motor 48. The inverter 50 converts the DC power supplied from the power supply circuit 24 into three phase AC power, and outputs the three phase AC power to the electric motor 48.

The converter 46 steps down the voltage of the DC power supplied from the power supply circuit 24, and outputs the stepped-down power to a device operated by DC power. The device operated by DC power is, for example, a cooling device that cools the power supply circuit 24, the PCU 42, the inverter 50, and the like. The device operated by DC power is, for example, an electronic control unit (ECU) that controls the power supply circuit 24, the gas turbine 38, the PCU 42, the inverter 50, and the like.

Each auxiliary power source device 28 includes a battery 52. The battery 52 is charged with electric power supplied from the main power source device 26. Further, electric power charged in the battery 52 is supplied to the load module 30.

Each main power source circuit 32 includes a common bus 54, two contactor units 56, six contactor units 58, two current sensors 62, and six current sensors 63. The current sensor 62 and the current sensor 63 correspond to a main power source current sensor of the present invention. The current sensor 62 corresponds to a first main power source current sensor of the present invention. The current sensor 63 corresponds to a second main power source current sensor of the present invention.

The common bus 54 connects the two main power source devices 26 in parallel with each other. The common bus 54 connects the six load modules 30 in parallel with each other. The main power source circuit 32 supplies electric power from the two main power source devices 26 to each load module 30.

Each contactor unit 56 is provided between each main power source device 26 and the common bus 54. The contactor unit 56 includes a contactor 57*a* and a contactor 57*b*. The contactor 57*a* is provided on a positive line of the main power source circuit 32. The contactor 57*b* is provided on a negative line of the main power source circuit 32.

Each contactor unit 56 switches between a conduction state and an interruption state between each main power source device 26 and the common bus 54.

Each contactor unit 58 is provided between each load module 30 and the common bus 54. The contactor unit 58 includes a contactor 59*a* and a contactor 59*b*. The contactor 59*a* is provided on the positive line of the main power source circuit 32. The contactor 59*b* is provided on the negative line of the main power source circuit 32.

Each contactor unit 58 switches between the conduction state and the interruption state between each load module 30 and the common bus 54.

Each current sensor 62 is provided between each contactor unit 56 and the common bus 54. The current sensor 62 is provided on the positive line of the main power source circuit 32. Each current sensor 63 is provided between each contactor unit 58 and the common bus 54. The current sensor 63 is provided on the positive line of the main power source circuit 32.

Each auxiliary power source circuit 34 includes a contactor unit 60 and a current sensor 65. The current sensor 65 corresponds to an auxiliary power source current sensor of the present invention.

The contactor unit 60 includes a contactor 61*a*, a contactor 61*b*, and a precharge circuit 61*c*. The contactor 61*a* is provided on a positive line of the auxiliary power source circuit 34. The contactor 61*b* is provided on a negative line of the auxiliary power source circuit 34. The precharge circuit 61*c* is provided in parallel with the contactor 61*b*. The precharge circuit 61*c* includes a contactor 61*d* and a resistor

61*e*. The current sensor 65 is provided on the negative line of the auxiliary power source circuit 34.

Each contactor unit 60 may include only the contactor 61*b* and the precharge circuit 61*c*. The precharge circuit 61*c* may be provided in parallel with the contactor 61*a*. In this case, each contactor unit 60 may include only the contactor 61*a* and the precharge circuit 61*c*.

Each load circuit 36 includes a current sensor 64. The current sensor 64 is provided on a positive line of the load circuit 36. The current sensor 64 corresponds to a load current sensor of the present invention.

A diode 66 is provided between the two main power source circuits 32 and each auxiliary power source circuit 34. An anode of each diode 66 is connected to the two main power source circuits 32, and a cathode thereof is connected to the auxiliary power source circuit 34. Each diode 66 allows electric power to be supplied from the two main power source circuits 32 to each auxiliary power source circuit 34. Each diode 66 prevents electric power from being supplied from each auxiliary power source circuit 34 to the two main power source circuits 32.

Thus, electric power is supplied from the main power source device 26 to each auxiliary power source device 28 via each diode 66. As a result, the battery 52 of each auxiliary power source device 28 is charged. Further, when the main power source circuit 32 is short-circuited, electric power of the auxiliary power source device 28 is prevented from flowing to the main power source circuit 32. As a result, even when the main power source circuit 32 is short-circuited, electric power can be supplied from each auxiliary power source device 28 to the drive unit 44 and the converter 46 in each load module 30.

A transistor 67 is provided in parallel with each diode 66. When the transistor 67 is ON, electric power is supplied from each auxiliary power source device 28 to the main power source circuit 32 while bypassing the diode 66.

A current sensor 68 is provided between one of the two main power source devices 26 and the two main power source circuits 32. The current sensor 68 is provided on a positive line connecting the one main power source device 26 and the two main power source circuits 32.

[Configuration of Control System]

Figure 3:
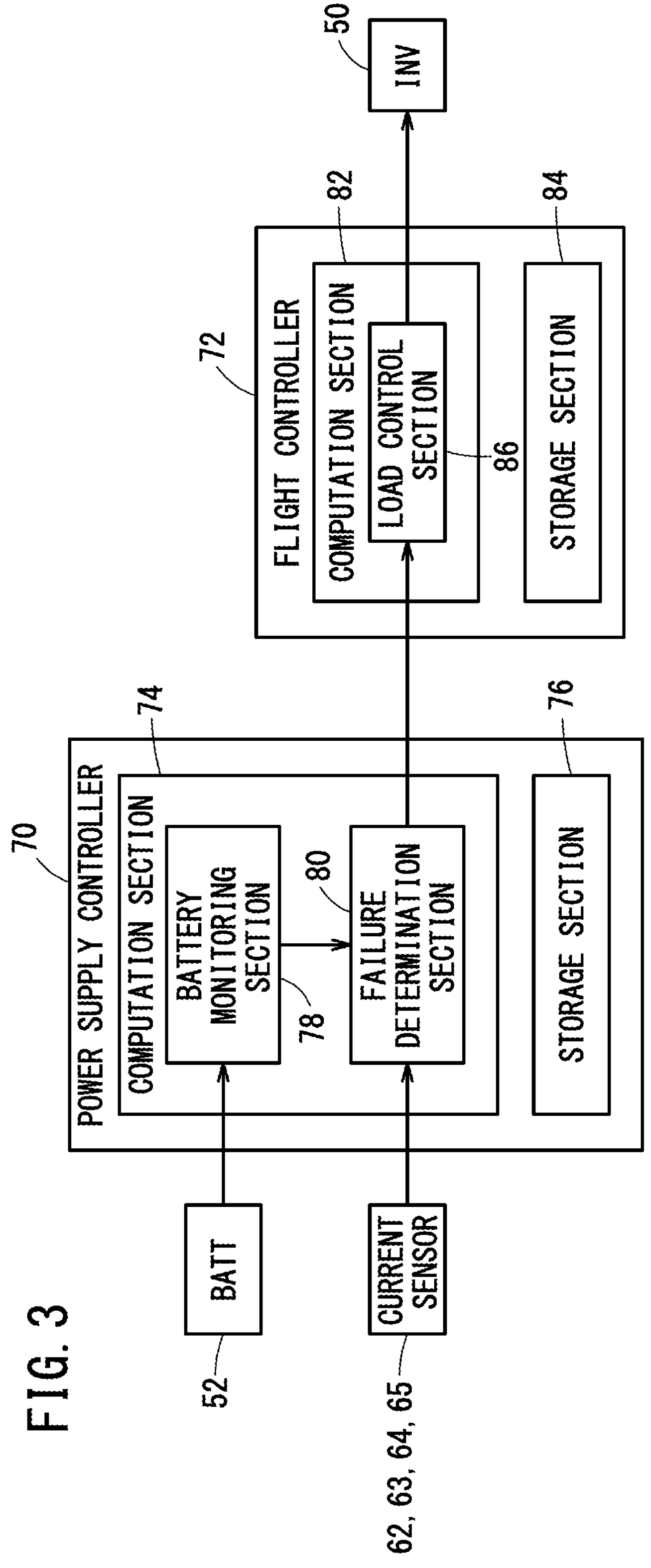
FIG. 3 is a block diagram showing a configuration of a control system.

FIG. 3 is a block diagram showing a configuration of a control system. The aircraft 10 includes a power supply controller 70 and a flight controller 72 as the control system.

The power supply controller 70 includes a computation section 74 and a storage section 76. The computation section 74 is, for example, a processor such as a central processing unit (CPU) or a graphics processing unit (GPU). The computation section 74 includes a battery monitoring section 78 and a failure determination section 80. The battery monitoring section 78 and the failure determination section 80 are realized by the computation section 74 executing programs stored in the storage section 76. At least part of the battery monitoring section 78 and the failure determination section 80 may be realized by an integrated circuit such as an application specific integrated circuit (ASIC) or a field-programmable gate array (FPGA). At least part of the battery monitoring section 78 and the failure determination section 80 may be realized by an electronic circuit including a discrete device.

The storage section 76 is configured by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage section 76 may be included in the processor, the integrated circuit, or the like described above.

The flight controller 72 includes a computation section 82 and a storage section 84. The computation section 82 is, for example, a processor such as a central processing unit (CPU) or a graphics processing unit (GPU). The computation section 82 includes a load control section 86. The load control section 86 is realized by the computation section 82 executing a program stored in the storage section 84. The load control section 86 may be realized by an integrated circuit such as an application specific integrated circuit (ASIC) or a field-programmable gate array (FPGA). The load control section 86 may be realized by an electronic circuit including a discrete device.

The storage section 84 is configured by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage section 84 may be included in the processor, the integrated circuit, or the like described above.

The battery monitoring section 78 monitors the state of charge (SOC) of the battery 52 of each auxiliary power source device 28. The battery monitoring section 78 outputs the SOC of the battery 52 of each auxiliary power source device 28 to the failure determination section 80.

The failure determination section 80 determines whether or not each current sensor of the power supply circuit 24 has failed, based on the current detected by each current sensor. When determining the failure of each current sensor, the failure determination section 80 causes the load control section 86 of the flight controller 72 to control each inverter 50. The failure determination of each current sensor will be described in detail below.

[Regarding Failure Determination of Current Sensor]

Figure 4:
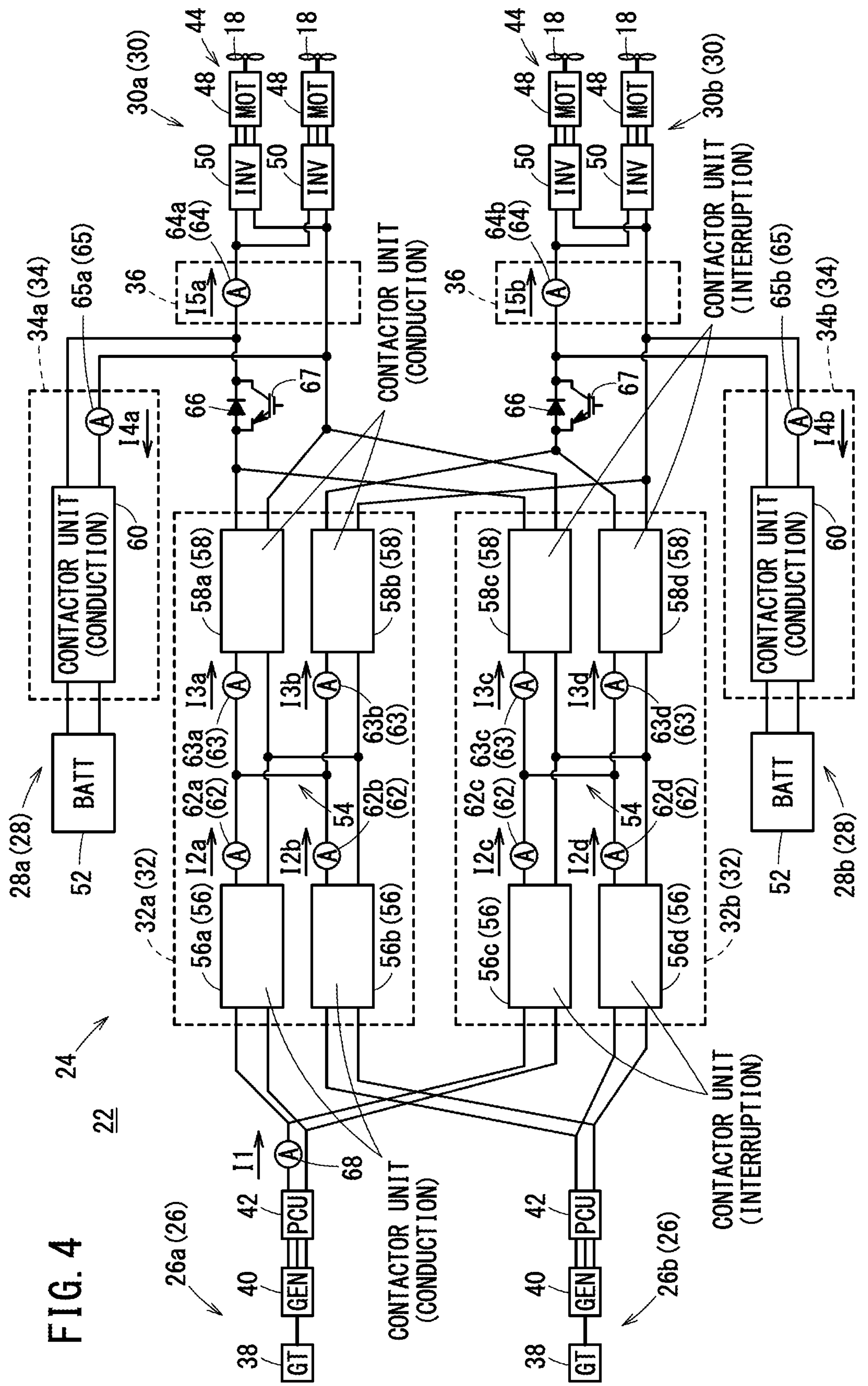
FIG. 4 is a schematic diagram of the power supply system.

FIG. 4 is a schematic diagram of the power supply system 22. FIG. 4 schematically shows a circuit configuration of the power supply circuit 24 between two main power source devices 26 and two load modules 30. Hereinafter, failure determination of each current sensor will be described with reference to FIG. 4. Even when the number of the main power source devices 26 is three or more and the number of the load modules 30 is three or more, the failure determination of each current sensor is performed by the same method as the method described below.

The arrows shown in FIG. 4 each indicate a direction in which the value of the current detected by each current sensor is positive. For the following description of failure determination of each current sensor, in FIG. 4, each main power source device 26, each auxiliary power source device 28, each load module 30, each main power source circuit 32, each auxiliary power source circuit 34, each load circuit 36, each contactor unit 56, each contactor unit 58, each contactor unit 60, each current sensor 62, each current sensor 63, each current sensor 64, and each current sensor 65 are denoted by specific reference numerals.

The failure determination section 80 performs failure determination of each current sensor in a state where electric power is supplied from the main power source device 26 to the load module 30. When electric power is supplied from the main power source device 26 to the load module 30, one of the two main power source circuits 32 is used. For example, as shown in FIG. 4, each of a contactor unit 56*a*, a contactor unit 56*b*, a contactor unit 58*a*, and a contactor unit 58*b* is brought into the conduction state. Further, each of a contactor unit 56*c*, a contactor unit 56*d*, a contactor unit 58*c*, and a contactor unit 58*d* is brought into the interruption state. In this case, the value of each of a current $I2c$ of a current sensor 62*c*, a current $I2d$ of a current sensor 62*d*, a current $I3c$ of a current sensor 63*c*, and a current $I3d$ of a current sensor 63*d* is 0.

(Case Where All Current Sensors Are Normal)

When all the current sensors in FIG. 4 are normal, the currents detected by the respective current sensors have the following relationship.

$$I2a+I2b=I3a+I3b$$

$$I3a=I5a-I4a$$

$$I3b=I5b-I4b$$

$$I1=I2a$$

When the currents detected by the respective current sensors satisfy the above relationship, the failure determination section 80 determines that none of the current sensors has failed.

(Case Where Current Sensor Provided between Main Power Source Device and Main Power Source Circuit Fails)

The current sensor 68 is provided between a main power source device 26*a* and a main power source circuit 32*a*. Further, the current sensor 68 is provided between the main power source device 26*a* and a main power source circuit 32*b*. When the current sensor 68 in FIG. 4 has failed, the currents detected by the respective current sensors have the following relationship.

$$I2a+I2b=I3a+I3b$$

$$I3a=I5a-I4a$$

$$I3b=I5b-I4b$$

$$I1\neq I2a$$

When the currents detected by the respective current sensors satisfy the above relationship, the failure determination section 80 determines that the current sensor 68 has failed.

(Case where Current Sensor of Main Power Source Circuit Fails)

The current sensor 62 and the current sensor 63 are provided in the main power source circuit 32. When a current sensor 62*a* in FIG. 4 has failed, the currents detected by the respective current sensors have the following relationship.

$$I2a+I2b\neq I3a+I3b$$

$$I3a=I5a-I4a$$

$$I3b=I5b-I4b$$

$$I1\neq I2a$$

When the currents detected by the respective current sensors satisfy the above relationship, the failure determination section 80 determines that the current sensor 62*a* has failed.

When a current sensor 62*b* in FIG. 4 has failed, the currents detected by the respective current sensors have the following relationship.

$$I2a+I2b\neq I3a+I3b$$

$$I3a=I5a-I4a$$

$$I3b=I5b-I4b$$

$$I1=I2a$$

When the currents detected by the respective current sensors satisfy the above relationship, the failure determination section 80 determines that the current sensor 62*b* has failed.

When a current sensor 63*a* in FIG. 4 has failed, the currents detected by the respective current sensors have the following relationship.

$$I2a+I2b\neq I3a+I3b$$

$$I3a\neq I5a-I4a$$

$$I3b=I5b-I4b$$

$$I1=I2a$$

When the currents detected by the respective current sensors satisfy the above relationship, the failure determination section 80 determines that the current sensor 63*a* has failed.

When a current sensor 63*b* in FIG. 4 has failed, the currents detected by the respective current sensors have the following relationship.

$$I2a+I2b\neq I3a+I3b$$

$$I3a=I5a-I4a$$

$$I3b\neq I5b-I4b$$

$$I1\neq I2a$$

When the currents detected by the respective current sensors satisfy the above relationship, the failure determination section 80 determines that the current sensor 63*b* has failed.

(Case Where Current Sensor of Auxiliary Power Source Circuit or Current Sensor of Load Circuit Fails)

The current sensor 65 is provided in the auxiliary power source circuit 34. The current sensor 64 is provided in the load circuit 36. When a current sensor 65*a* in FIG. 4 has failed or when a current sensor 64*a* in FIG. 4 has failed, the currents detected by the respective current sensors have the following relationship.

$$I2a+I2b=I3a+I3b$$

$$I3a\neq I5a-I4a$$

$$I3b=I5b-I4b$$

$$I1=I2a$$

That is, when the current sensor 65*a* has failed and when the current sensor 64*a* has failed, the currents detected by the respective current sensors have the same relationship. Therefore, a case where the current sensor 65*a* has failed and a case where the current sensor 64*a* has failed cannot be distinguished from each other.

In this case, the failure determination section 80 stops the supply of electric power to a load module 30*a*. Specifically, the failure determination section 80 causes the load control section 86 to turn off all switching elements of the inverters 50 of the drive units 44 in the load module 30*a*.

In a state where the supply of electric power to the load module 30*a* is stopped, if the current I3*a* detected by the current sensor 63*a* and the current I4*a* detected by the current sensor 65*a* have the following relationship, the failure determination section 80 determines that the current sensor 65*a* has failed.

$$I3\neq -I4a$$

In a state where the supply of electric power to the load module 30*a* is stopped, if the current I3*a* detected by the current sensor 63*a* and the current I4*a* detected by the current sensor 65*a* have the following relationship, the failure determination section 80 determines that the current sensor 64*a* has failed.

$$I3\neq -I4a$$

When a current sensor 65*b* in FIG. 4 has failed or when a current sensor 64*b* in FIG. 4 has failed, the currents detected by the respective current sensors have the following relationship.

$$I2a+I2b=I3a+I3b$$

$$I3a=I5a-I4a$$

$$I3b\neq I5b-I4b$$

$$I1=I2a$$

That is, when the current sensor 65*b* has failed and when the current sensor 64*b* has failed, the currents detected by the respective current sensors have the same relationship. Therefore, a case where the current sensor 65*b* has failed and a case where the current sensor 64*b* has failed cannot be distinguished from each other.

In this case, the failure determination section 80 stops the supply of electric power to a load module 30*b*. Specifically, the failure determination section 80 causes the load control section 86 to turn off all switching elements of the inverters 50 of the drive units 44 in the load module 30*b*.

In a state where the supply of electric power to the load module 30*b* is stopped, if the current I3*b* detected by the current sensor 63*b* and the current I4*b* detected by the current sensor 65*b* have the following relationship, the failure determination section 80 determines that the current sensor 65*b* has failed.

$$I3b\neq -I2a$$

In a state where the supply of electric power to the load module 30*b* is stopped, if the current I3*b* detected by the current sensor 63*b* and the current I4*b* detected by the current sensor 65*b* have the following relationship, the failure determination section 80 determines that the current sensor 64*b* has failed.

$$I3b\neq -I4b$$

Note that, when the SOC of the battery 52 of an auxiliary power source device 28*a* is less than a predetermined value, the failure determination section 80 stops the supply of electric power to the load module 30*a*. This is because, when the supply of electric power to the load module 30*a* is stopped in a state where the SOC of the battery 52 of the auxiliary power source device 28*a* is equal to or higher than the predetermined value, the battery 52 of the auxiliary power source device 28*a* is charged with surplus electric power, and the battery 52 is overcharged. Similarly, when the SOC of the battery 52 of an auxiliary power source device 28*b* is less than a predetermined value, the failure determination section 80 stops the supply of electric power to the load module 30*b*.

When the supply of electric power to the load module 30*a* is stopped, the load control section 86 increases the output power of the electric motor 48 of the drive unit 44 in the load module 30*b*, as compared with a case where electric power is supplied to the load module 30*a*. When the supply of electric power to the load module 30*a* is stopped, no thrust can be obtained by the VTOL rotor 18 driven by the electric motor 48 of the drive unit 44 in the load module 30*a*. In this case, the output power of the electric motor 48 of the drive unit 44 in the load module 30*b* is increased to supplement the thrust using a different VTOL rotor 18. Similarly, when the supply of electric power to the load module 30*b* is stopped, the load control section 86 increases the output power of the electric motor 48 of the drive unit 44 in the load module 30*a*, as compared with a case where electric power is supplied to the load module 30*b*.

In the same manner as described above, when the supply of electric power to some of the load modules 30 is stopped and the thrust of some of the cruise rotors 20 cannot be obtained, the output of the electric motors 48 for driving different cruise rotors 20 may be increased.

Advantageous Effects

Figure 5:
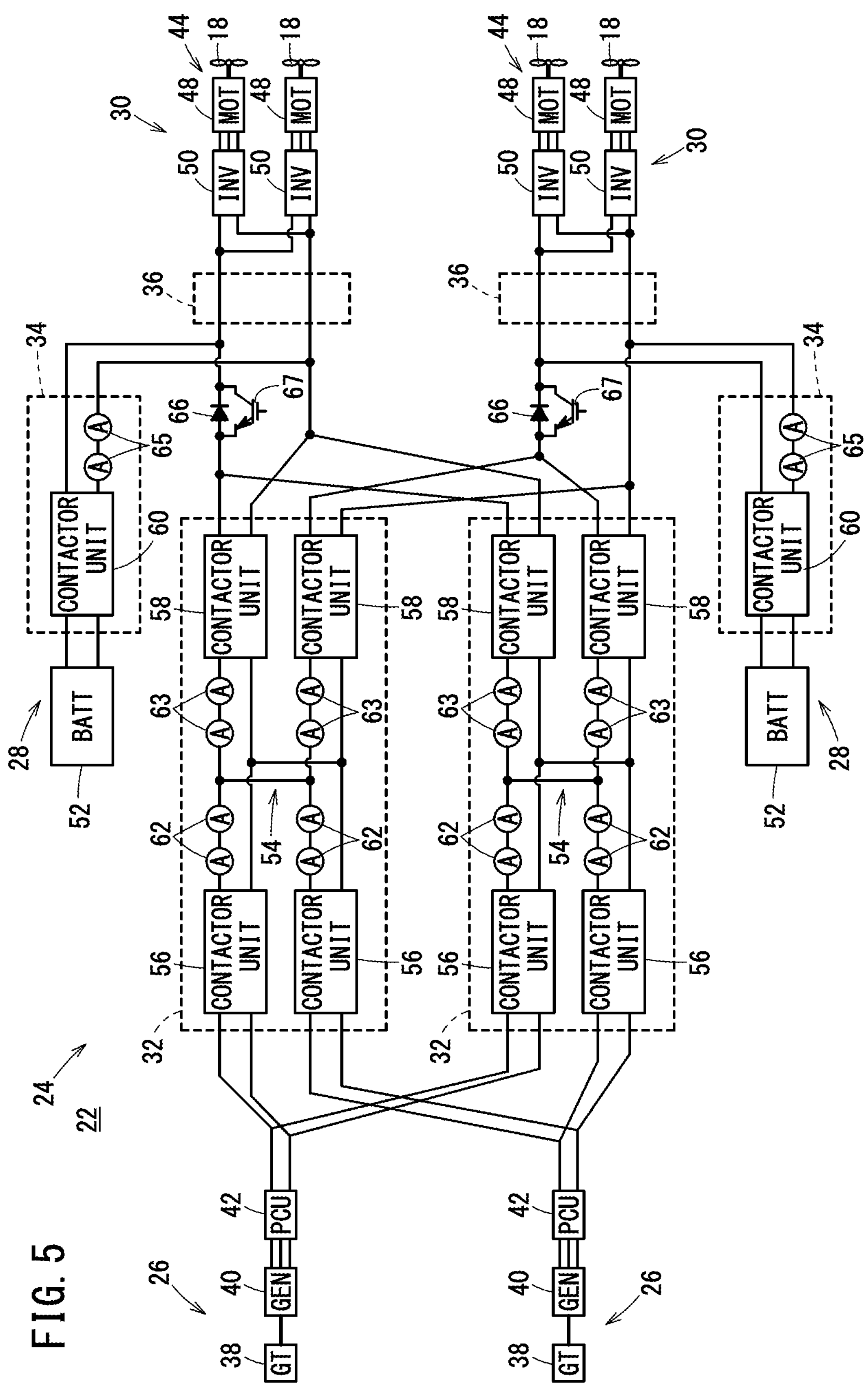
FIG. 5 is a schematic diagram of a power supply system.

FIG. 5 is a schematic diagram of a power supply system 22 of a comparative example. In the power supply system 22, the current sensor 62 and the current sensor 63 need to be provided in the main power source circuit 32 in order to detect an abnormality such as a disconnection or a short circuit in the main power source circuit 32. In addition, the current sensor 65 needs to be provided in the auxiliary power source circuit 34 in order to detect an abnormality such as a disconnection or a short circuit in the auxiliary power source circuit 34.

In order to determine whether or not each of the current sensor 62, the current sensor 63, and the current sensor 65 has failed, it is conceivable to duplicate each of the current sensor 62, the current sensor 63, and the current sensor 65 as shown in FIG. 5.

However, when all of the current sensor 62, the current sensor 63, and the current sensor 65 are duplicated, there is a problem that the weight of the power supply system 22 increases. In addition, there is a problem that the manufacturing cost of the power supply system 22 increases.

In the power supply system 22 of the present embodiment, the current sensor 64 is provided in the load circuit 36. The load circuit 36 is connected to the main power source circuit 32 and the auxiliary power source circuit 34 at a merging point where current flowing through the main power source circuit 32 and current flowing through the auxiliary power source circuit 34 merge together. As a result, without duplicating any of the current sensor 62, the current sensor 63, and the current sensor 65, the failure determination section 80 can determine whether or not each of the current sensor 62, the current sensor 63, and the current sensor 65 has failed. Therefore, an increase in the weight of the power supply system 22 can be suppressed. In addition, an increase in the manufacturing cost of the power supply system 22 can be suppressed.

In the power supply system 22 of the present embodiment, in a state where electric power is supplied from the main power source device 26 to all the load modules 30, the failure determination section 80 determines which of the current sensor 62 and the current sensor 63 of the main power source circuit 32 has failed. As a result, the failure determination section 80 can accurately determine which of the current sensor 62 and the current sensor 63 has failed.

In the power supply system 22 of the present embodiment, in a state where the supply of electric power from the main power source device 26 to one of the load modules 30 is stopped, the failure determination section 80 determines which of the current sensor 65 of the auxiliary power source circuit 34 and the current sensor 64 of the load circuit 36 has failed. As a result, the failure determination section 80 can accurately determine which of the current sensor 65 and the current sensor 64 has failed.

In the power supply system 22 of the present embodiment, when the SOC of the battery 52 of the auxiliary power source device 28 is less than the predetermined value, the failure determination section 80 stops the supply of electric power to the load module 30 corresponding to the auxiliary power source device 28. As a result, it is possible to prevent the battery 52 from being overcharged.

In the power supply system 22 of the present embodiment, when the supply of electric power to some of the load modules 30 is stopped, the failure determination section 80 causes the load control section 86 to increase the output power of the electric motors 48 of the drive units 44 in the other load modules 30, as compared with a case where electric power is supplied to the some load modules 30. As a result, even when some of the VTOL rotors 18 are stopped, the thrust can be supplemented by the remaining VTOL rotors 18. Similarly, even when some of the cruise rotors 20 are stopped, the thrust can be supplemented by the remaining cruise rotors 20.

Note that the present invention is not limited to the above disclosure, and various modifications are possible without departing from the essence and gist of the present invention.

Regardless of the structure of the power supply circuit 24 of the first embodiment, in various power supply circuits 24 as well, the failure determination section 80 can determine whether or not each current sensor has failed by the same method as in the first embodiment.

Figure 6:
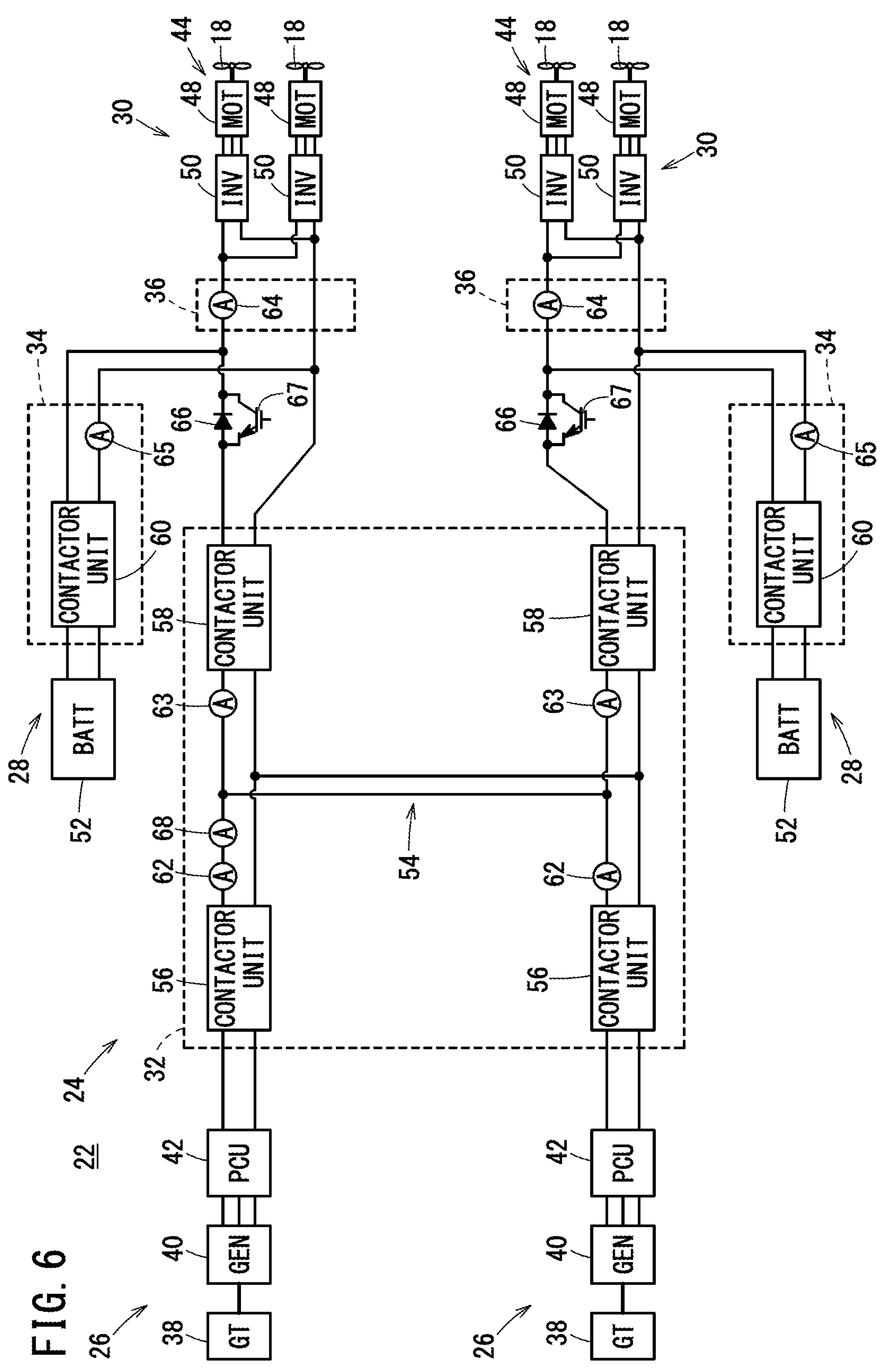
FIG. 6 is a schematic diagram of the power supply system.

FIG. 6 is a schematic diagram of the power supply system 22. In the power supply system 22 of the first embodiment (FIG. 4), the power supply circuit 24 includes two main power source circuits 32. On the other hand, as shown in FIG. 6, the power supply circuit 24 may include one main power source circuit 32. In this case, the current sensor 68 may be provided in the main power source circuit 32.

Figure 7:
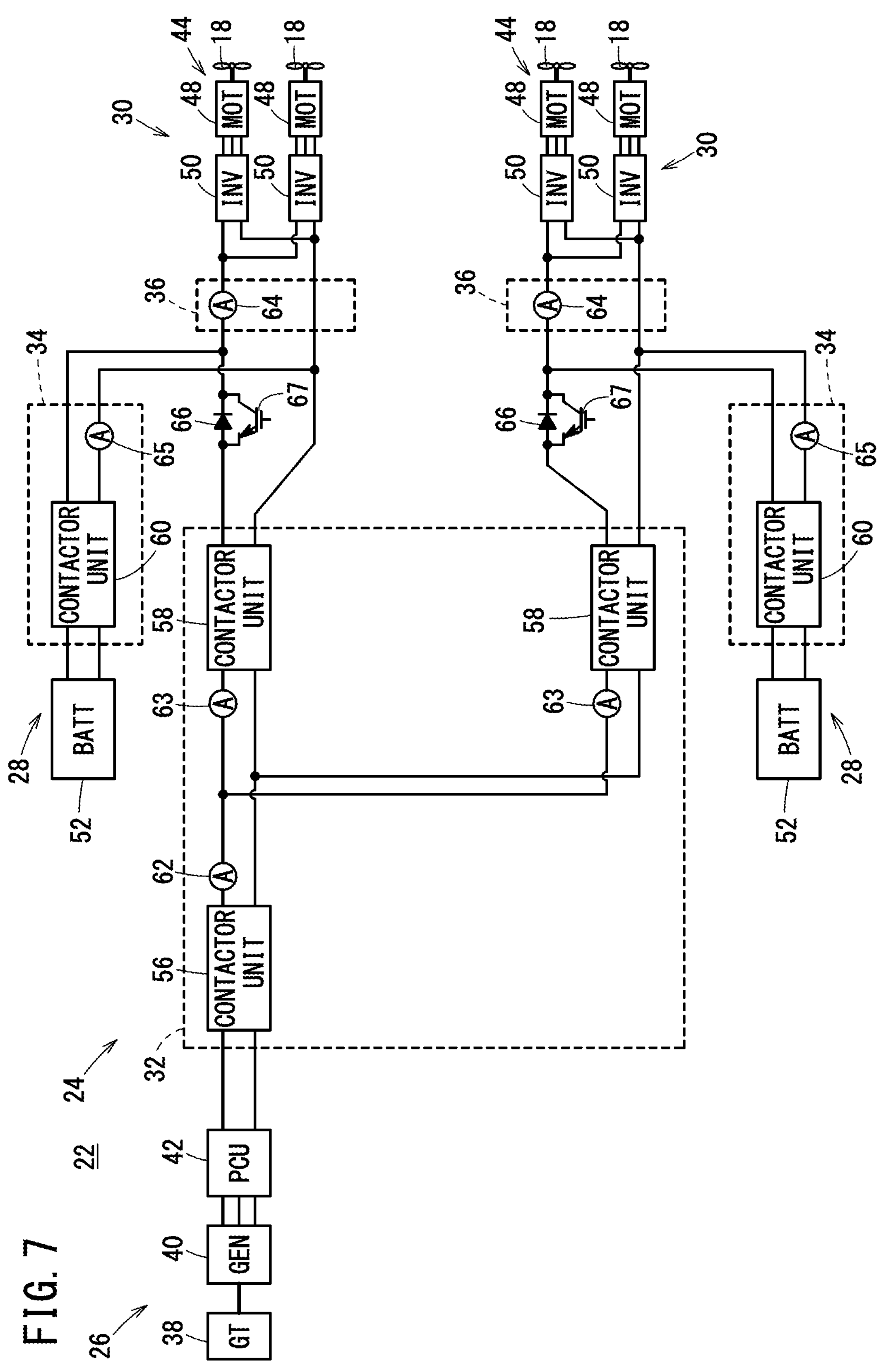
FIG. 7 is a schematic diagram of the power supply system.

FIG. 7 is a schematic diagram of the power supply system 22. In the power supply system 22 of the first embodiment (FIG. 4), the power supply circuit 24 supplies electric power from two main power source devices 26 to each load module 30. On the other hand, as shown in FIG. 7, the power supply circuit 24 may supply electric power from one main power source device 26 to each load module 30. In this case, the current sensor 68 can be omitted.

Figure 8:
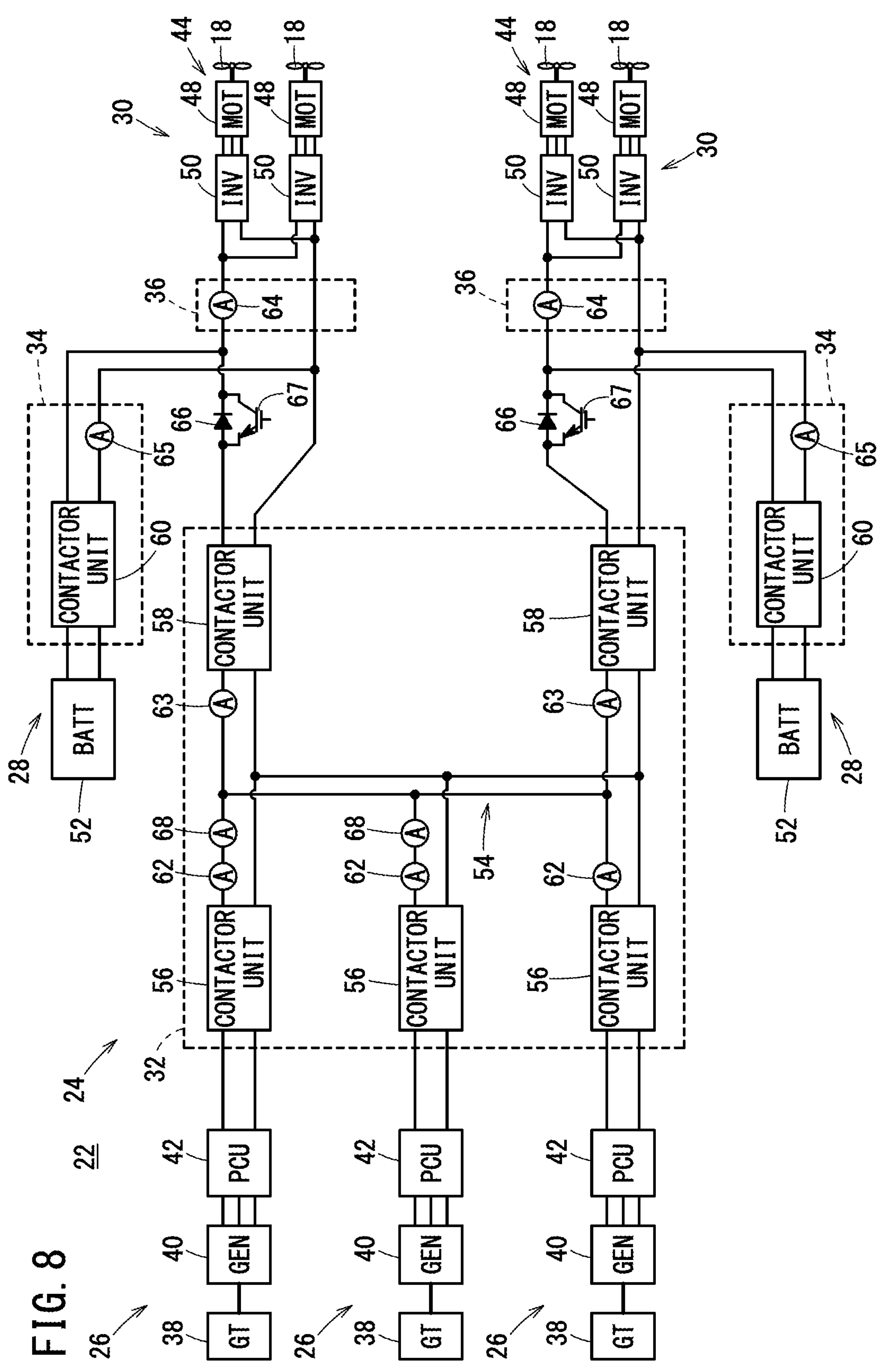
FIG. 8 is a schematic diagram of the power supply system.

FIG. 8 is a schematic diagram of the power supply system 22. In the power supply system 22 of the first embodiment (FIG. 4), the power supply circuit 24 supplies electric power from two main power source devices 26 to each load module 30. On the other hand, as shown in FIG. 8, the power supply circuit 24 may supply electric power from three main power source devices 26 to each load module 30. In this case, it is necessary to provide two current sensors 68.

In the power supply system 22 of the first embodiment, the main power source device 26 includes the gas turbine 38, the generator 40, and the PCU 42. Instead, the main power source device 26 may include a battery or a capacitor.

In addition to the gas turbine 38, the generator 40, and the PCU 42, the main power source device 26 may include elements such as a sensor, a fuse, a relay, a breaker, a diode, a transistor, a resistor, a coil, and a capacitor.

In the power supply system 22 of the first embodiment, the auxiliary power source device 28 includes the battery 52. Instead, the auxiliary power source device 28 may include a gas turbine, a generator, and a PCU. Alternatively, the auxiliary power source device 28 may include a capacitor.

In addition to the battery 52, the auxiliary power source device 28 may include elements such as a sensor, a fuse, a relay, a breaker, a diode, a transistor, a resistor, a coil, and a capacitor.

The load module 30 may include elements such as a sensor, a fuse, a relay, a breaker, a diode, a transistor, a resistor, a coil, and a capacitor, in addition to the drive unit 44 including the electric motor 48 and the inverter 50, and the converter 46.

The main power source circuit 32 may include elements such as a sensor, a fuse, a relay, a breaker, a diode, a transistor, a resistor, a coil, and a capacitor, in addition to the common bus 54, the contactor unit 56, the contactor unit 58, the current sensor 62, and the current sensor 63.

The auxiliary power source circuit 34 may include elements such as a sensor, a fuse, a relay, a breaker, a diode, a transistor, a resistor, a coil, and a capacitor, in addition to the contactor unit 60 and the current sensor 65.

The load circuit 36 may include elements such as a sensor, a fuse, a relay, a breaker, a diode, a transistor, a resistor, a coil, and a capacitor, in addition to the current sensor 64.

Invention Obtained from Embodiments

The invention that can be grasped from the above embodiments will be described below.

Provided is the power supply system (22) including: one or more main power source devices (26) configured to supply electric power to one or more load devices (30); one or more auxiliary power source devices (28) provided for the one or more load devices, respectively, each of the auxiliary power source devices being configured to supply electric power to corresponding one of the load devices; the main power source circuit (32) connected to the one or more main power source devices; the auxiliary power source circuit (34) provided for each of the auxiliary power source devices and connected to corresponding one of the auxiliary power source devices; the load circuit (36) provided for each of the load devices, connected to corresponding one of the load devices, and connected to the main power source circuit and the auxiliary power source circuit at the merging point where the current flowing through the main power source circuit and the current flowing through the auxiliary power source circuit merge together; the main power source current sensor (62, 63) configured to detect the current flowing through the main power source circuit; the auxiliary power source current sensor (65) configured to detect the current flowing through the auxiliary power source circuit; and the load current sensor (64) configured to detect a current flowing through the load circuit. According to this feature, an increase in the weight of the power supply system can be suppressed. In addition, an increase in the manufacturing cost of the power supply system can be suppressed.

In the above-described power supply system, each of the main power source devices may supply electric power to the plurality of the load devices, the main power source circuit may include the common bus (54) configured to transmit electric power from each of the main power source devices to the plurality of load devices, the main power source current sensor may include the first main power source current sensor (62) provided between each of the main power source devices and the common bus, and the second main power source current sensor (63) provided between the common bus and the merging point, the power supply system may include the failure determination section (80) configured to determine which of the first main power source current sensor, the second main power source current sensor, the auxiliary power source current sensor and the load current sensor has failed, wherein in a state where electric power is supplied from each of the main power source devices to all of the plurality of load devices, the failure determination section may determine which of the first main power source current sensor and the second main power source current sensor has failed, based on the current detected by each of the first main power source current sensor, the second main power source current sensor, the auxiliary power source current sensor, and the load current sensor, and in a state where supply of electric power from each of the main power source devices to part of the plurality of load devices is stopped, the failure determination section may determine which of the auxiliary power source current sensor and the load current sensor has failed, based on the current detected by each of the first main power source current sensor, the second main power source current sensor, the auxiliary power source current sensor, and the load current sensor. According to this feature, an increase in the weight of the power supply system can be suppressed. In addition, an increase in the manufacturing cost of the power supply system can be suppressed.

In the above-described power supply system, each of the auxiliary power source devices may include the battery (52), the power supply system may include the battery monitoring section (78) configured to monitor the state of charge (SOC) of the battery, and when the SOC of the battery of each of the auxiliary power source devices corresponding to the part of the load devices is less than the predetermined value, the failure determination section may stop the supply of the electric power to the part of the load devices. According to this feature, overcharge of the battery can be suppressed.

In the above-described power supply system, when the supply of the electric power to the part of the load devices is stopped, the failure determination section may increase the output power of another part of the plurality of load devices, as compared with a case where the electric power is supplied to the part of the load devices. According to this feature, a decrease in the output power of the part of the load devices can be compensated by an increase in the output power of the other load devices.

The invention claimed is:

1. A power supply system comprising:

one or more main power source devices configured to supply electric power to one or more load devices;

one or more auxiliary power source devices provided corresponding to the one or more load devices; respectively, each of the auxiliary power source devices being configured to supply electric power to corresponding one of the load devices;

a main power source circuit connected to the one or more main power source devices;

an auxiliary power source circuit provided for each of the auxiliary power source devices and connected to corresponding one of the auxiliary power source devices;

a load circuit provided corresponding to each of the load devices, connected to corresponding one of the load devices, and connected to the main power source circuit and the auxiliary power source circuit at a merging point where a current flowing through the main power source circuit and a current flowing through the auxiliary power source circuit merge together;

a main power source current sensor configured to detect the current flowing through the main power source circuit;

an auxiliary power source current sensor configured to detect the current flowing through the auxiliary power source circuit; and a load current sensor configured to detect a current flowing through the load circuit, wherein each of the main power source devices supplies electric power to a plurality of the load devices, the main power source circuit includes a common bus configured to transmit electric power from each of the main power source devices to the plurality of load devices, the main power source current sensor includes a first main power source current sensor provided between each of the main power source devices and the common bus, and a second main power source current sensor provided between the common bus and the merging point, and wherein the power supply system comprises one or more processors that execute computer-executable instructions stored in a memory, and the one or more processors execute the computer-executable instructions to cause the power supply system to:

in a state where electric power is supplied from each of the main power source devices to all of the plurality of load devices, determine which of the first main power source current sensor and the second main power source current sensor has failed, based on a current detected by each of the first main power source current sensor, the second main power source current sensor, the auxiliary power source current sensor, and the load current sensor; and stop supply of electric power from each of the main power source devices to part of the plurality of load devices, and determine which of the auxiliary power source current sensor and the load current sensor has failed, based on the current detected by each of the first main power source current sensor, the second main power source current sensor, the auxiliary power source current sensor, and the load current sensor.

2. The power supply system according to claim 1, wherein each of the auxiliary power source devices includes a battery, and the one or more processors cause the power supply system to monitor a state of charge of the battery, and stop the supply of the electric power to the part of the load devices when the state of charge of the battery of each of the auxiliary power source devices corresponding to the part of the load devices is less than a predetermined value.

3. The power supply system according to claim 1, wherein when the supply of the electric power to the part of the load devices is stopped, the one or more processors cause the power supply system to increase output power of another part of the plurality of load devices, as compared with a case where the electric power is supplied to the part of the load devices.

4. The power supply system according to claim 1, wherein each of the auxiliary power source devices includes a battery, and the one or more processors cause the power supply system to monitor a state of charge of the battery, and stop the supply of the electric power to the part of the load devices when the state of charge of the battery of each of the auxiliary power source devices corresponding to the part of the load devices is less than a predetermined value.

5. The power supply system according to claim 1, wherein when the supply of the electric power to the part of the load devices is stopped, the one or more processors cause the power supply system to increase output power of another part of the plurality of load devices, as compared with a case where the electric power is supplied to the part of the load devices.

6. A power supply system comprising:

one or more main power source devices configured to supply electric power to one or more load devices;

one or more auxiliary power source devices provided corresponding to the one or more load devices; respectively, each of the auxiliary power source devices being configured to supply electric power to corresponding one of the load devices;

a main power source circuit connected to the one or more main power source devices;

an auxiliary power source circuit provided for each of the auxiliary power source devices and connected to corresponding one of the auxiliary power source devices;

a load circuit provided corresponding to each of the load devices, connected to corresponding one of the load devices, and connected to the main power source circuit and the auxiliary power source circuit at a merging point where a current flowing through the main power source circuit and a current flowing through the auxiliary power source circuit merge together;

a main power source current sensor configured to detect the current flowing through the main power source circuit;

an auxiliary power source current sensor configured to detect the current flowing through the auxiliary power source circuit; and a load current sensor configured to detect a current flowing through the load circuit, wherein each of the main power source devices supplies electric power to a plurality of the load devices, the main power source circuit includes a common bus configured to transmit electric power from each of the main power source devices to the plurality of load devices, the main power source current sensor includes a first main power source current sensor provided between each of the main power source devices and the common bus, and a second main power source current sensor provided between the common bus and the merging point, and wherein the power supply system comprises one or more processors that execute computer-executable instructions stored in a memory, and the one or more processors execute the computer-executable instructions to cause the power supply system to:

in a state where electric power is supplied from each of the main power source devices to all of the plurality of load devices, determine which of the first main power source current sensor and the second main power source current sensor has failed, based on a current relationship at a time where a current is detected by each of the first main power source current sensor, the second main power source current sensor, the auxiliary power source current sensor, and the load current sensor; and in a state where supply of electric power from each of the main power source devices to part of the plurality of load devices is stopped, determine which of the auxiliary power source current sensor and the load current sensor has failed, based on the current relationship at a time where a current is detected by each of the first main power source current sensor, the second main power source current sensor, the auxiliary power source current sensor, and the load current sensor.

* * * * *